Patented Aug. 24, 1954

2,687,438

UNITED STATES PATENT OFFICE 2,687,438

METHOD OF PREPARING α,α-DIALKYL-α-ARYL CARBINOLS

Eugene J. Lorand, Wilmington, Del., and John E. Reese, St. Simons Island, Ga., assignors to Hercules Powder Company, Wilmington, Del., a corporation of Delaware No Drawing. Application December 2, 1950, Serial No. 198,907

8 Claims. (Cl. 260—618)

This invention relates to the preparation of alkyl-substituted alcohols having the structural formula

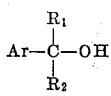

in which Ar represents an aryl or substituted aryl group and $R_1$ and $R_2$ represent alkly groups. More particularly, the invention relates to the production of tertiary alcohols by an apparent oxido-reduction between certain tertiary hydroperoxides such as α,α-dimethyl-p-methylbenzyl hydroperoxide and α,α-dimethylbenzyl hydroperoxide and certain aryl-substituted tertiary hydrocarbons such as cymene and cumene.

The oxidation of cymene in the presence of heavy metal salts is known to produce p-toluic acid, terephthalic acid, cumic acid, p-methylacetophenone, cumic aldehyde, α,α-dimethyl-p-methylbenzyl alcohol, p-methyl-α-methyl styrene, and α,α-dimethyl-p-methylbenzyl hydroperoxide. The oxidation of cumene is likewise known to produce a variety of similar compounds such as might be expected as a result of oxidation of the isopropyl group. The difficulty of producing the tertiary alcohols, namely, α,α-dimethyl-p-methylbenzyl alcohol and α,α-dimethylbenzyl alcohol without the simultaneous production of all or nearly all of the possible oxidation products as by-products was in part overcome in U. S. 2,438,125 in which the hydroperoxide is produced along with the alcohol under conditions favoring hydroperoxide formation and then causing the decomposition of the hydroperoxide to the tertiary alcohol under conditions favoring that particular decomposition. In carrying out a decomposition of this type, the reduction of the hydroperoxide is not balanced by an increase in the content of tertiary alcohol in the reaction mixture formed from the hydrocarbon.

It has now been found that improved yields of aryldialkylmethyl alcohol, ROH,

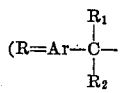

where $R_1$ and $R_2$ represent alkyl groups and Ar represents an aryl or substituted group) are obtained by contacting an aryldialkylmethyl hydroperoxide, ROOH (where R is the same as above), with an aryldialkylmethane, RH (where R is the same as above), out of contact with sufficient air to cause oxidation therefrom in the presence of a heavy metal salt at a temperature within the range of about 40 to about 75° C. until substantially all of the hydroperoxide has disappeared from the reaction mixture.

The process of this invention is usually carried out by preparing the aryldialkylmethyl hydroperoxide by oxidation of the aryldialkylmethane with an oxygen-containing gas in the absence of heavy metal salts under conditions favoring the formation of the aryldialkylmethyl hydroperoxide until only a portion of the aryldialkylmethane has become oxidized to the corresponding hydroperoxide, and then commingling the hydroperoxide with sufficient hydrocarbon to form a solution containing less than about 30% hydroperoxide in the presence of a heavy metal salt catalyst and agitating until substantially all of the hydroperoxide has disappeared from the reaction mixture.

The following examples show more fully with respect to specific materials how the reaction is carried out. All amounts are based on parts by weight.

Example I

A mixture of 25 parts pure α,α-dimethylbenzyl hydroperoxide in 17.1 parts cumene was slowly added to a mixture of 1 part cobalt naphthenate in 47.1 parts cumene with stirring in a nitrogen atmosphere free of oxygen while maintaining a temperature of 48–52° C. for a period of 6.5 hours. At the end of this length of time, the hydroperoxide content was 0.7%. The total weight of product, less 1.45 parts taken during the course of the run for analysis, amounted to 87.2 parts and was shown by combustion analyses to contain 89.2% of the oxygen introduced in the form of the hydroperoxide. The product was freed of catalyst by filtering through a layer of siliceous filter aid, and was then subjected to reduced pressure distillation to obtain:

| | |
|---|---|
| Distillate, parts | 72.15 |
| Acetophenone, parts | 1.78 |
| α,α-Dimethylbenzyl alcohol, parts | 17.65 |
| Residue, parts | 12.56 |
| α,α-Dimethylbenzyl peroxide, parts | 9.24 |

Example II

A dispersion of 100 parts p-diisopropylbenzene in 100 parts 2% aqueous sodium hydroxide solution dispersed with 0.34 part potassium stearate was contacted with oxygen in a fine stream at about 50° C. until the organic layer contained about 30% hydroperoxide and about 70% p-diisopropylbenzene. The organic layer was separated, cooled to −20° C. to crystallize out a trace of peroxide, and filtered. The filtrate was then added dropwise with stirring to a solution of 5 parts dehydrated lead-manganese acetate in 50 parts diisopropylbenzene maintained at 60° C. When the addition was completed, the temperature was then raised to 70° C. for 3 hours to complete the reaction of about 4% hydroperoxide which remained in the solution. The catalyst was removed by adsorption on a siliceous filter aid and the organic product was then steam distilled. The distillate was redistilled under reduced pressure to obtain 22 parts α,α-dimethyl-p-isopropylbenzyl alcohol and 2.5 parts p-isopropylacetophenone. The residue of the steam distillation amounted to 9.9 parts and was chiefly bis(α,α-dimethyl-p-isopropylbenzyl) peroxide.

*Example III*

A mixture was made from 90 parts p-cymene and 45 parts α,α-dimethyl-p-methylbenzyl hydroperoxide, which had been purified by precipitation with concentrated sodium hydroxide and subsequently releasing the hydroperoxide by means of dilute mineral acid. This mixture was then added dropwise with stirring to a solution of 8 parts manganese naphthenate in 45 parts cymene while maintaining the latter solution at 50° C. After all of the hydroperoxide solution had been added, the temperature was raised to 70° C. and held at that temperature for 3 hours. Then the catalyst was removed by adsorption on a column of siliceous filter aid. The filtrate was steam distilled and the distillate was then fractionally distilled under reduced pressure to obtain 34 parts α,α-dimethyl-p-methylbenzyl alcohol and 3.7 parts p-methyl acetophenone. The residue from the steam distillation contained 15.6 parts bis(α,α-dimethyl-p-methylbenzyl) peroxide.

When the process of this invention is carried out in such a manner that a 30% or greater concentration of hydroperoxide is formed in the aryldialkylmethane reaction mixture, there is a tendency toward peroxide formation from the hydroperoxide as well as formation of the desired tertiary alcohol. This is shown experimentally in Example I. It is, therefore, preferred that the concentration of hydroperoxide in the reaction mixture be kept less than about 30%. However, if the concentration of hydroperoxide is kept below about 5% of the mixture, substantially no peroxide is formed from the hydroperoxide, and this maximum is preferably not exceeded when it is desired to produce the tertiary alcohol as the major product.

In order to produce the tertiary alcohol from the hydroperoxide with a minimum of peroxide in the product, the hydroperoxide is preferably slowly commingled with the aryldialkylmethane in which the heavy metal salt catalyst is dissolved in such a manner that the hydroperoxide in the solution is maintained at a low level below that indicated above as by slow addition of the hydroperoxide to the hydrocarbon. If the hydroperoxide is added at the same rate as the hydroperoxide disappears, a low concentration of hydroperoxide can be maintained throughout the process and a minimum of aryldialkylperoxide will be found in the product. In fact, the process can be so adjusted that the hydroperoxide content is maintained so low that no detectable amount of peroxide will be found in the final product.

The aryldialkylmethyl hydroperoxides which are caused to undergo an oxido-reduction reaction with aryldialkylmethanes in accordance with this invention for the production of the corresponding tertiary alcohols may have the same or different structure from that of the aryldialkylmethane. The examples have shown the reaction in which the aryldialkylmethyl radical is the same for both the hydroperoxide and the hydrocarbon. The reaction may also be carried out between hydroperoxides and hydrocarbons having dissimilar radicals. For instance, cymene hydroperoxide may be contacted with cumene or cumene hydroperoxide may be contacted with cymene under the conditions of this invention to produce a mixture of α,α-dimethyl-p-methylbenzyl alcohol and α,α-dimethylbenzyl alcohol. The net result of the reaction is that the hydroperoxide is reduced to the corresponding alcohol and the hydrocarbon is oxidized to the corresponding carbinol.

The formulas

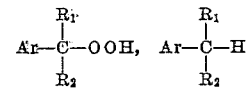

and

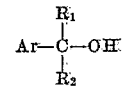

have been applied broadly to the hydroperoxide, hydrocarbon, and alcohol concerned in the present invention. In these general formulas Ar represents aryl or substituted aryl groups such as phenyl, naphthyl, ar-tetrahydronaphthyl, tolyl, isopropylphenyl, and other hydrocarbon substituted phenyls, chlorophenyl, nitrophenyl, bromophenyl, chloronaphthyl, nitronaphthyl, bromonaphthyl, acetophenyl, acetonaphthyl, alkoxyphenyl, alkoxynaphthyl, and the like; $R_1$ and $R_2$ may be the same or different and represent hydrocarbon radicals such as methyl, ethyl, propyl, butyl, etc. Thus, in general, tertiary hydrocarbons having a single hydrogen on the carbon alpha to an aromatic ring are capable of being oxidized in accordance with this invention by being contacted with a tertiary hydroperoxide in which the hydroperoxide group is on the carbon alpha to an aromatic ring in the presence of a heavy metal salt.

The process of this reaction may be carried out either with a purified hydroperoxide and a pure hydrocarbon or it may be carried out using a partially oxidized hydrocarbon rich in hydroperoxides. The method of carrying out the procedure by adding such partially oxidized hydrocarbon to hydrocarbon containing catalyst is particularly valuable as a procedure by which a minimum of by-product peroxides are formed. Since peroxides are ordinarily not desired, the improvement over a process of simply adding a catalyst to a partially oxidized hydrocarbon without dilution is obvious. Thus it will be apparent that the hydroperoxides can be prepared by any satisfactory procedure and then be added to the hydrocarbon which it is desired to convert to the alcohol or the hydrocarbon can be partially oxidized to hydroperoxide and the mixture can be added to fresh hydrocarbon in the presence of catalyst. Although it is known to effect oxidation of hydrocarbons in the presence of catalysts of this invention, such a procedure leads to a high proportion of by-products, the ratio of one by-product to the other varying with the actual conditions used, and oxidation of the by-products leads to further by-products, chiefly ketonic and acidic. The present procedure involving a two-step process of first oxidizing the hydrocarbon to a hydroperoxide in the absence of heavy metal catalysts and subsequently reacting the hydroperoxide with the hydrocarbon in the presence of heavy metal catalysts gives a lower proportion of by-products and a greater yield of alcohol based on the hydroperoxide. While an oxygen-containing atmosphere may be present during the second step, namely, the process of the present invention, the conditions should be nonoxidizing conditions. Thus, the reaction mixture should not be intimately contacted with the oxygen as by creating a dispersion of the gas and the liquid or by continuously supplying fresh oxygen to maintain a high oxygen ratio in the gas. Under nonoxidizing conditions, there is no hydroperoxide formation which causes an increase in hydroperoxide or which causes the hydroperoxide content to remain constant by continuous replacement of that peroxide entering into reaction. Even a hydroperoxide-hydrocarbon mixture formed by rapid oxidation of hydrocarbon in the presence of heavy metal catalysts will build up hydroperoxides, and if these hydroperoxides are then caused to react with hydrocarbon at an increased dilution under nonoxidizing conditions, a much lower proportion of by-products is formed.

The heavy metal salts which serve as catalysts for this reaction are the salts of those metals known as heavy metals, i. e., metals having a density greater than four, an atomic weight greater than forty, and low atomic volume. Of this group, the preferred salts are the salts of the drier metals which are those metals which catalyze the drying of paints and varnishes, namely, lead, manganese, iron, zinc, and cobalt salts. At least part of the heavy metal may be present, if desired, in the form of a hydroxide or oxide to form salts with any acid formed during the reaction.

The heavy metal salts may be organic or inorganic and are preferably soluble in the hydroperoxide mixture to the extent of at least about 0.1%. The preferred salts are the organic salts such as the resinate, naphthenate, stearate, oleate, cumate, laurate, and salts of other carboxylic acids. Mixtures of salts of different metals and different acids as well as mixtures of salts of heavy metals along with oxides or hydroxides of the same or different metals may also be used. Salts formed by reaction between acids formed in the reaction and oxides or hydroxides of the heavy metals also act as catalysts in the same manner as preformed salts of the heavy metals.

The amount of catalyst may be varied depending upon the speed of the oxido-reduction with the particular reactants. In general, however, the amount of catalyst dissolved in the mixture will be within the range of about 0.4 to about 20% of the weight of the reaction mixture. The preferred range is 2–5%.

The temperature likewise depends upon the speed of the oxido-reduction of the particular reactions. The temperature should, in general, be at least about 40° C. but should not be permitted to rise above about 70° C. unless means for neutralizing acids formed in the reaction is provided for. Means for neutralizing acids may involve the use of oxides or hydroxides of the heavy metals or other means known to the art. The preferred temperature range is about 40° C. to about 60° C. If the reaction temperature rises too high, carboxylic acids form and may cause dehydration of the tertiary alcohol. Acidity of the mixture can to a certain extent be limited by having present in the mixture oxides or hydroxides of the heavy metals with which salt formation can take place. However, the undesired dehydration of the tertiary alcohol can be prevented by maintaining a temperature within the range of about 40° C. to about 65° C. With certain compounds temperatures up to about 75° C. can be tolerated but with some loss of yield due to side reactions. Higher temperatures toward the end of the reaction are advantageous for counteracting the effect of slowing down of the reaction due to the low concentration of hydroperoxides. Prolonged use of high temperature will cause side reactions to predominate and are objectionable for that reason.

The products obtained in accordance with this invention find various commercial applications. For example, $\alpha,\alpha$-dimethyl-p-methylbenzyl alcohol is used in the essential oil industry as a perfume base for soaps, and the compound is also an efficient frothing agent in the flotation of copper, zinc, and lead sulfide ores. Dimethylbenzyl alcohol has similar commercial applications. Similarly, substituted aryldimethylbenzyl alcohols find application as perfume materials and as intermediates in the formation of other compounds for use in the drug and related fields.

What we claim and desire to protect by Letters Patent is:

1. The process which comprises adding a hydroperoxide of the formula ROOH to an aryl-substituted hydrocarbon of the formula RH in the presence of a heavy metal salt catalyst at a temperature within the range of about 40° to about 70° C. at a rate no greater than the rate of disappearance of hydroperoxide from the solution and subsequently recovering an alcohol of the formula ROH as the major product from the reaction mixture, the R in said formuals being a radical of the formula

where $R_1$ and $R_2$ represent alkyl groups and Ar represents an aryl radical.

2. The process of preparing an alcohol of the formula ROH which comprises contacting a hydroperoxide of the formula ROOH with an aryl-substituted hydrocarbon of the formula RH in the presence of a heavy metal salt catalyst at a temperature within the range of about 40° to about 70° C. out of contact with sufficient air to cause oxidation therefrom until substantially all of the hydroperoxide has disappeared, R in each instance being a radical of the formula

where $R_1$ and $R_2$ represent alkyl groups and Ar represents an aryl radical.

3. The process of claim 2 in which the heavy metal salt is salt of an organic acid.

4. The process of claim 2 in which $R_1$ and $R_2$ are methyl groups and Ar is a phenyl group.

5. The process of claim 2 in which $R_1$ and $R_2$ are methyl groups and Ar is a chlorophenyl group.

6. The process of claim 2 in which $R_1$ and $R_2$ are methyl groups and Ar is a nitrophenyl group.

7. The process of claim 2 in which $R_1$ and $R_2$ are methyl groups and Ar is a tolyl group.

8. The process of claim 2 in which $R_1$ and $R_2$ are methyl groups and Ar is a naphthyl group.

References Cited in the file of this patent

UNITED STATES PATENTS

| Number | Name | Date |
|---|---|---|
| 2,302,466 | Palmer et al. | Nov. 17, 1942 |
| 2,376,674 | Emerson et al. | May 2, 1945 |
| 2,438,125 | Lorand et al. | Mar. 23, 1948 |